Feb. 6, 1951     E. BUEHLER     2,540,095
VAPOR DISPENSER
Filed Oct. 31, 1947     2 Sheets-Sheet 1
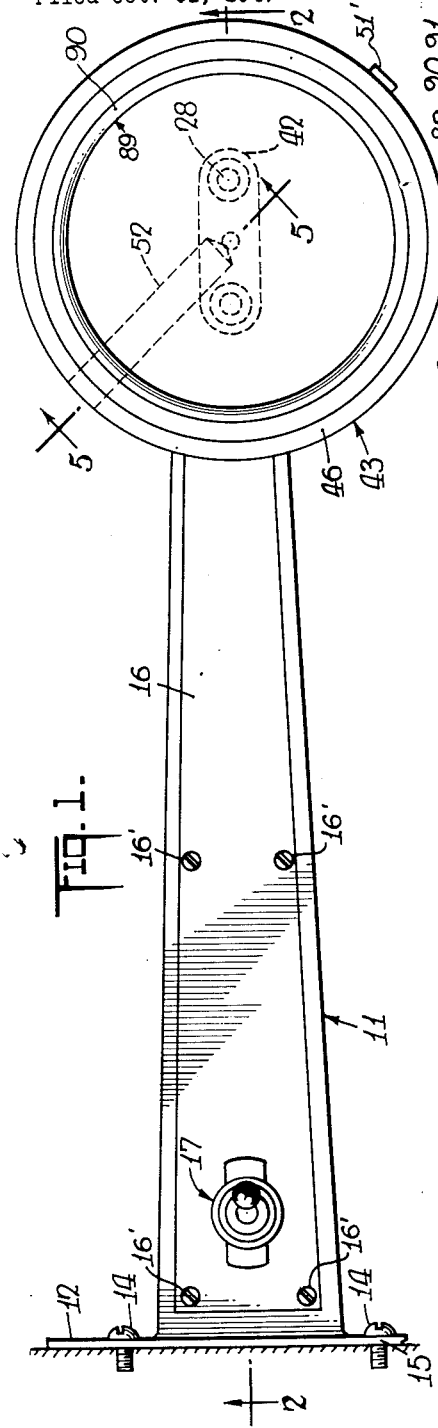
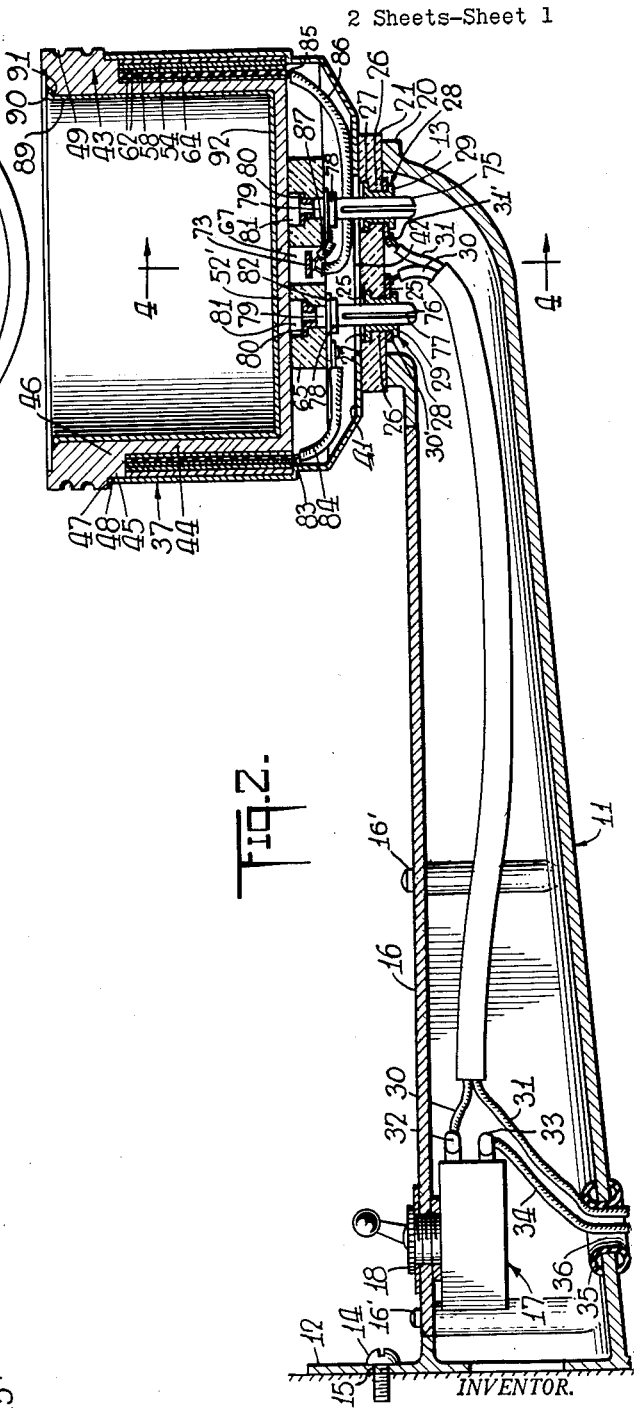
INVENTOR.
Emil Buehler
BY
Dean Fairbank & Hirsch
ATTORNEYS.

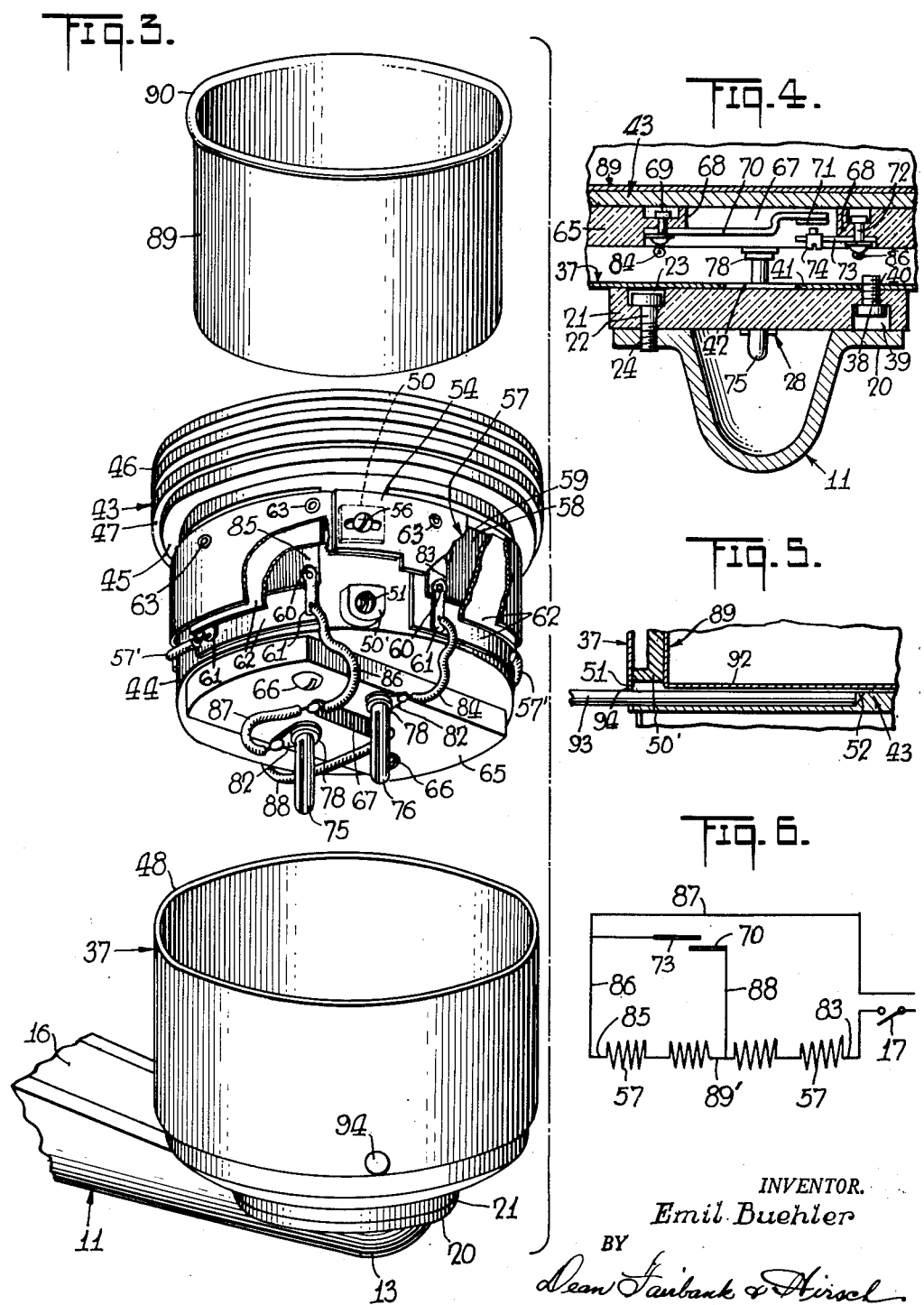

Patented Feb. 6, 1951

2,540,095

UNITED STATES PATENT OFFICE 2,540,095

VAPOR DISPENSER

Emil Buehler, North Haledon, N. J., assignor to American Aerovap, Inc., New York, N. Y., a corporation of New York Application October 31, 1947, Serial No. 783,325

22 Claims. (Cl. 219—38)

1

This invention relates to the art of heating devices and more particularly to the dispensing of insecticides and fumigants in the form of a vapor, especially in the aerosol range.

It is among the objects of the invention to provide a heating device of the above type that is rugged, compact and of neat appearance, that is easy to charge, the temperature of which may be controlled, that has no moving parts and is not likely to become deranged, that lends itself readily to mass production and that may quickly be disassembled for inspection and repair.

Features of the invention, separately and in combination, are a cup shaped receptacle of heat conducting metal, girdled by a plurality of heating elements electrically insulated therefrom, but in effective heat conducting relation thereto, a metal cup, preferably removably disposed in said receptacle and snugly fitted therein and containing a solid insecticide that is not volatile at room temperature, an insulated block affixed under the bottom of the heat conducting receptacle and carrying a thermostat in a recess therein, whereby the contents of the cup may be maintained within the required temperature range for desired rate of volatilization thereof without decomposition, and a pair of prongs affixed to the block and in circuit with the heating elements and the thermostat which, when the receptacle is plugged into a holder therefor, electrically connects the receptacle to the house circuit, and also mechanically retains the receptacle in said holder for instant removal when required.

In the accompanying drawings in which are shown one or more of various possible embodiments of the several features of the invention:

Fig. 1 is a top plan view of the device,

Fig. 2 is a cross sectional view thereof, taken along line 2—2 of Fig. 1,

Fig. 3 is a dropped perspective view of the device with parts broken away, showing the holder, the heating receptacle and the cup, Fig. 4 is a fragmentary cross-sectional view taken along line 4—4 of Fig. 2, Fig. 5 is a view similar to Fig. 4 taken along line 5—5 of Fig. 1, and Fig. 6 is a wiring diagram of the device.

Referring now to the drawings, the device comprises a hollow bracket arm 11 preferably of cast iron, which is shown trough-shaped in cross section and may taper from the mounting plate 12 at one end thereof, unitary therewith and at right angles thereto, to the upwardly turned opposite end 13 thereof. Plate 12 may be mounted on a wall or post by means of screws 14 which

2 pass through openings 15 in the plate near the edges thereof so that the upper face of arm 11 is horizontal.

A cover plate 16, which provides access to the interior of the hollow bracket arm 11, is removably affixed to the open top thereof by means of screws 16', and mounts an on-off switch 17, rigidly affixed thereto by a lock nut 18 adjacent the mounting plate 12.

The upwardly turned end 13 of bracket arm 11 has an annular horizontal flange 20 unitary therewith, slightly above the top of bracket arm 11. A disk 21 desirably of ceramic material is affixed to flange 20 by means of screws 22 which pass through countersunk openings 23 in the disk into correspondingly threaded openings 24 in the flange 20. Disk 21 has a pair of diametrically opposed openings 25 therethrough which are countersunk to form shoulders 26. Seated on each of the shoulders 26 is the flange end 27 of a socket eyelet 28, the lower end of which is clenched over as at 29.

A pair of leads 30 and 31 which extend through the body of the bracket arm 11, are connected as by soldering to terminal lugs 30' and 31', said lugs each being held by the corresponding eyelet 28. Lead 30 is connected to terminal 32 of on-off switch 17; the other terminal 33 of the switch is connected by lead 34 to the source of current (not shown) as is lead 31, the latter two leads passing through a rubber grommet 35 in opening 36 at the lower face of the bracket arm 11.

A substantially cylindrical cup shaped holder 37 is affixed to disk 21 by means of screws 38 which pass upward through countersunk openings 39 in the lower face of the disk 21 into threaded opening 40 in the bottom 41 of holder 37. Removably mounted in said holder 37 is a substantially cylindrical cup shaped heating receptacle 43 of heat conducting material such as aluminum. The receptacle, which has an external diameter slightly less than that of the holder, supports a plurality of heating elements 57. In the embodiment shown herein, four heating elements 57 are provided, each of which comprises a rectangular strip 58 of insulating material around which a resistance wire 59 is wound. Each end of the latter is respectively affixed by soldering to a rivet 60 on the ends of the associated strip 58, each of the rivets 60 also clamping a terminal lug 61 thereto. On each face of insulating strip 58 is a rectangular mica sheet 62. Sheets 62 and strip 58 are affixed in longitudinally spaced relation to a metal strip 54 by rivets 63. By means of connectors 57' between lugs 61 of adjacent heating elements 57, the latter are connected in series. The strip 54 girdles the side wall 44 of the heating receptacle 43 and its ends are affixed thereto by a screw 56 pressing the ends of said strip against a flat boss 50 on said side wall.

An asbestos strip or shield 64, the ends of which are glued together, encompasses the metal strip 54 and serves to heat-insulate the holder 37 from the heating receptacle 43 contained therein.

The receptacle 43 has an upper rim 46 overhanging the upper edge of the heating assembly thereabout. The rim 46 is rabbeted at 47 to the inner diameter of holder 37, and said rabbet affords a shoulder resting upon the upper edge 48 of holder 37.

A block 65 desirably of ceramic material is affixed under the bottom of the heating receptacle 43 by screws 66. Block 65 has a longitudinal slot or recess 67 therethrough with countersunk ledges 68 at each end thereof. Affixed to one of said ledges 68 by a rivet 69 is a bimetallic arm 70 having a contact 71 at the free end thereof. Affixed to the other of said ledges 68 by a rivet 72 is a contact arm 73 having an adjustable screw contact 74 at its free end in registry with contact 71 at the free end of bimetallic arm 70 and normally spaced therefrom. Affixed to block 65 on each side of slot 67 and extending outwardly therefrom, are prongs 75 and 76 bifurcated as at 77. The root end of each of the prongs extends through the block 65 as at 79 and is flared as at 80 in a countersunk hole 81 in the block, rigidly to retain the prong in place. A lug 82 encompassing each of the prongs 75 and 76 is compressed against the lower face of the block by flange 78 near the root end of the prongs and thereby rigidly retained in position.

End 83 of the series connected heating elements 57, as shown in Figs. 2, 3 and 6, is connected to lug 82 of prong 76 by lead 84. The other end 85 of the heating elements 57 is connected to contact arm 73 by lead 86 and to lug 82 of prong 75 by lead 87. A lead 88 from the series connection 89' between the second and third heating elements 57 is connected to bimetallic arm 70 of the thermostat.

When heating receptacle 43 is inserted into holder 37 by plugging the prongs 75 and 76 through slot 42 in the bottom 41 of the holder into socket eyelets 28, said prongs serve both as a mechanical holding means and electrical contact means and the shoulder 47 of the receptacle rests on rim 48 of the holder as has heretofore been described.

The use of the eyelet type sockets for prongs 75 and 76 dispenses with the need for precision work in the manufacture of the parts of the device, thus expediting mass production of the same. For, if the length of the receptacle or the thickness of block 65 on which the prongs are affixed should vary from unit to unit, the tolerance afforded by the open ended eyelet socket will still permit the shoulder of the receptacle to rest on said rim 48.

A cup 89 which has a diameter slightly less than the inner diameter of heating receptacle 43 is removably seated therein, the outwardly flared rim 90 of the cup resting on the beveled rim 91 of the receptacle to support the cup. Inasmuch as the inner wall of the heating receptacle is devoid of obstruction, the heating elements being on the exterior thereof and the bottom is likewise unobstructed, the thermostat and its mount being thereunder, the walls and bottom of the cup will lie in close juxtaposition to the corresponding parts of the receptacle for facility of heat transfer therefrom to the cup.

The cup is filled with an insecticide in solid form such as DDT, or other insecticide, not volatile at room temperature and hence easy to transport and store. The cup is desirably made from aluminum which is anodized to provide a protective coating therefor so that it will not be affected by the action of the chemicals contained therein.

When switch 17 is closed, a circuit is completed through the heating elements 57 which will heat the heating receptacle 43 and thereby heat the contents of the cup sufficiently to volatilize the same slowly.

The thermostat 70, 73 is connected to short circuit two of the heating elements 57 when the temperature reaches its upper limit, so that under continued heating by the two remaining heating elements, the consequent reduction in temperature will cause the thermostat to cool and again open for more intense heating after the desired lower limit of temperature has been reached. Thus overheating or decomposition of the chemical is avoided, and yet the temperature is at all times sufficiently elevated for volatilization at the desired rate.

In order to determine if the device is operating properly, a thermometer 93 may be inserted through an opening 94 in holder 37 which is aligned with a lateral opening 51 in an embossment 50' upon the heating receptacle which has a radial groove 52 in the floor thereof. As the thermometer will be between the heating receptacle and the metal cup 89, it will accurately indicate the temperature of the contents of the latter.

A plug 51' is screwed through opening 94 in holder 37 into threaded opening 51 in boss 50' to close the latter when not in use and also to retain the heating receptacle firmly in the holder.

It can be seen that it is a relatively simple matter to recharge the device after the contents of the cup have been exhausted, this operation requiring merely the replacement of the empty cup 89 with a full one. As those parts that may require service are all affixed to the heating receptacle, it is not necessary to detach the entire device from the wall for repair but merely to lift out the heating receptacle 43 and to introduce a replacement receptacle by simply pushing its prongs into eyelet sockets 28. A burnt out heating element is easily replaced by removing the metal strip 54 to which it is affixed and replacing it with a new unit.

As many changes could be made in the above construction and many apparently widely different embodiments of this invention could be made without departing from the scope of the claims, it is intended that all matter contained in the above description or shown in the accompanying drawings shall be interpreted as illustrative and not in a limiting sense.

Having thus described my invention what I claim as new and desire to secure by Letters Patent of the United States is:

1. An article of the character described, comprising a substantially cup shaped holder, contact means near the bottom of said holder and electrically insulated therefrom, a substantially cup shaped heating receptacle in said holder and electrically insulated therefrom, heating means for said heating receptacle and affixed thereto, an insulating block rigid with said heating receptacle, contact means rigid with said insulating block and detachably connected to the contact means near the bottom of said holder, and thermostatic control means in said insulating block for regulating the temperature of the contents of said heating receptacle.

2. The combination set forth in claim 1 in which said heating means comprises a plurality of heating elements rigid with and electrically insulated from said heating receptacle and girdling the latter.

3. An aerosol dispenser comprising a substantially cup shaped holder, an electrical socket at the bottom of said holder and electrically insulated therefrom, a heating receptacle in said holder, heating means for said receptacle girdling the latter and affixed thereto, an insulating block affixed to the bottom of said heating receptacle, a prong rigid with said block and coacting with said electrical socket to make electrical and mechanical contact therewith, removably to affix said heating receptacle in said holder, a removable cup seated in said receptacle, and means on said block for regulating the temperature of the contents of said heating receptacle.

4. An aerosol dispenser comprising a bracket, a holder rigid therewith, an electrical socket rigid with said bracket and electrically insulated therefrom and from said holder, a heating receptacle having prong means coacting with said socket removably to affix said heating receptacle in said holder, heating means for said receptacle affixed thereto, a cup seated in said heating receptacle, and means for regulating the temperature of the contents of said cup.

5. An aerosol dispenser comprising a bracket, a cylindrical holder rigid with said bracket, a pair of sockets rigid with said bracket and electrically insulated therefrom and from said holder, a cylindrical heating receptacle having a pair of prongs coacting with said sockets, removably to affix said heating receptacle in said holder, heating means for said receptacle affixed thereto, a removable cup seated in said heating receptacle, and means for regulating the temperature of the contents of said cup.

6. An article of the character described comprising a bracket, an insulating disk affixed to said bracket, a pair of electrical sockets rigid with said disk, a holder affixed to said disk, a heating receptacle having a pair of prongs coacting with said sockets, removably to affix said heating receptacle in said holder, heating means affixed to said heating receptacle and girdling the same, a removable cup seated in said heating receptacle, and means for regulating the temperature of the contents of said cup.

7. An article of the character described comprising a substantially cup shaped holder, contact means near the bottom of said holder and rigid therewith and electrically insulated therefrom, a removable cup shaped heating receptacle in said holder having contact terminals detachably coacting with said contact means, and electrical heater means rigid with said heating receptacle and connected to said contact terminals.

8. The combination set forth in claim 7 in which a removable cup is provided snugly fitting the inner wall of said heating receptacle.

9. The combination set forth in claim 7 in which said electrical heater means comprises a plurality of heater elements, a metal strip therefor to which said heater elements are affixed in electrically insulated relation, said metal strip being removably affixed to the outer wall of said heating receptacle and girdling the same.

10. The combination set forth in claim 7 in which said contact terminals are disposed below the bottom of said heating receptacle and insulated therefrom.

11. An article of the character described, comprising a substantially cup shaped holder, a removable cup shaped heating receptacle in said holder of slightly less diameter than the latter, coacting prong and socket contact means on said holder and said receptacle, an insulating block mounting one of said contact means and disposed beneath the bottom of said heating receptacle and affixed thereto, electrical heater means for said heating receptacle encompassing the latter and positioned between the wall thereof and the holder, and thermostatic control means affixed to said block in a recess therein for regulating the temperature of the contents of said heating receptacle.

12. An article of the character described comprising a substantially cup shaped holder, contact means near the bottom of said holder rigid therewith and electrically insulated therefrom, a removable cup shaped heating receptacle in said holder of slightly less diameter than the latter, said receptacle having a rim with a rabbet of substantially the diameter of said holder and forming a shoulder whereby the rim of said receptacle is seated against said shoulder, contact terminals on said heating receptacle coacting with said contact means, an insulating block mounting said contact terminals and disposed beneath the bottom of said heating receptacle and affixed thereto, electrical heater means for said heating receptacle encompassing the latter affixed thereto and positioned between the wall thereof and the holder, and thermostatic control means affixed to said block in a recess therein for regulating the temperature of the contents of said heating receptacle.

13. An article of the character described comprising a bracket having a mounting plate unitary therewith at one end thereof and a horizontal flange at the opposite end thereof, an insulating disk affixed to said flange, a pair of electrical sockets rigid with said disk, a substantially cylindrical cup shaped holder rigid with said disk, a cylindrical heating receptacle having a pair of prongs coacting with said sockets removably to affix said heating receptacle in said holder, a plurality of heating elements affixed to said heating receptacle and girdling the same, a removable cup seated in said heating receptacle, and thermostatic means for controlling the temperature of the contents of said removable cup.

14. An article of the character described comprising a bracket having a mounting plate unitary therewith at one end thereof and a horizontal flange at the opposite end thereof, an insulating disk affixed to said flange, a pair of electrical sockets rigid with said disk, a holder affixed to said disk, a heating receptacle, an insulating block affixed to the bottom of said heating receptacle, a pair of prongs rigid with said block and extending therefrom, a plurality of heating elements encompassing said heating receptacle and connected to said prongs, said prongs coacting with said sockets, removably to affix said heating receptacle in said holder, and thermostatic means for controlling the temperature of the contents of said heating receptacle.

15. The combination set forth in claim 14 in which an asbestos strip encompasses said metal strip and the heating elements affixed thereto, thereby heat-insulating said heating elements from said holder.

16. An article of the character described comprising a hollow bracket, an insulating disk affixed to said bracket, a pair of electrical sockets rigid with said disk, a holder affixed to said disk, a heating receptacle, an insulating block affixed to the bottom of said heating receptacle, a pair of prongs rigid with said block and extending therefrom, a metal band encompassing said heating receptacle and affixed thereto, a plurality of heating elements affixed to said metal band and connected to said prongs, said prongs coacting with said sockets removably to affix said heating receptacle in said holder, and thermostatic means for controlling the temperature of the contents of said heating receptacle.

17. The combination set forth in claim 16 in which a removable cover plate is affixed to the top of said hollow bracket to provide access thereto.

18. An article of the character described comprising a bracket having a horizontal flange at one end thereof, an insulating disk resting upon and affixed to said flange, a pair of electrical sockets on said disk, a holder affixed to said disk, a heating receptacle, an insulating block under said heating receptacle and affixed thereto, a pair of prongs rigid with said block and extending therefrom, a metal band encompassing said heating receptacle and affixed thereto, a plurality of heating elements affixed to said metal band and connected to said prongs, said prongs coacting with said sockets removably to affix said heating receptacle in said holder, and thermostatic means affixed to said block in a recess therein for controlling the temperature of the contents of said heating receptacle.

19. An article of the character described comprising a bracket having a mounting plate unitary therewith at one end thereof and at right angles thereto and a horizontal flange at the opposite end thereof, an insulating disk affixed to said flange, a pair of socket eyelets rigid with said disk, a holder affixed to said disk, a heating receptacle, an insulating block beneath said heating receptacle and affixed thereto, a pair of prongs rigid with said block and extending therefrom, an embossment on the wall of said heating receptacle having an aperture therethrough extending through said receptacle and aligned with a corresponding opening in said holder whereby a thermometer may be inserted through said holder into said receptacle, a metal band encompassing said heating receptacle and affixed thereto, a plurality of heating elements affixed to and electrically insulated from said metal band and connected to said prongs, said prongs coacting with said socket eyelets removably to affix said heating receptacle in said holder, and thermostatic means affixed to said block in a recess therein for controlling the temperature of the contents of said receptacle.

20. An article of the character described comprising a bracket having a holder cup rigid therewith, sockets near the bottom of said holder cup and electrically insulated from said bracket and said cup, a removable heating receptacle in said holder, said receptacle having a pair of prongs affixed in insulated relation under the bottom thereof and rigid with said receptacle for releasable coaction with said socket, electrical heating means girdling said receptacle and affixed thereto, electrically insulated therefrom and electrically connected with respect to said prongs, said heating means being encompassed by said holder, and a metal cup snugly fitting the smooth side and bottom wall of said receptacle, in heat conducting relation with respect thereto and removable therefrom.

21. The combination set forth in claim 20 in which a thermostat is provided, affixed under the bottom of said heating receptacle, to control the temperature of the contents of said metal cup.

22. An article of manufacture comprising a plug-in cup shaped heating receptacle, a plurality of heating elements, a metal band to which said heating elements are affixed, said band girdling said heating receptacle and removably affixed thereto, an insulating block affixed beneath said heating receptacle, contact plugs rigid with said block and extending therefrom, and thermostatic control means affixed to said block in a recess therein and connected to said heating elements and said contact plugs.

E. BUEHLER.

REFERENCES CITED

The following references are of record in the file of this patent:

UNITED STATES PATENTS

| Number | Name | Date |
| --- | --- | --- |
| 1,393,751 | Chapin | Oct. 18, 1921 |
| 1,404,317 | Pieper et al. | Jan. 24, 1922 |
| 1,680,621 | Kercher | Aug. 14, 1928 |
| 1,795,328 | Brown | Mar. 10, 1931 |
| 1,801,538 | Briscoe | Apr. 21, 1931 |
| 1,802,654 | Katzman | Apr. 28, 1931 |
| 2,147,319 | Smith | Feb. 14, 1939 |
| 2,155,930 | Chapman | Apr. 25, 1939 |
| 2,208,130 | Jaroll | July 16, 1940 |
| 2,223,780 | Carathers | Dec. 3, 1940 |